(12) United States Patent
Morisaki

(10) Patent No.: US 10,805,159 B2
(45) Date of Patent: Oct. 13, 2020

(54) SERVER-BASED APPLICATION SOFTWARE EXECUTION SYSTEM

(71) Applicant: FANUC CORPORATION, Yamanashi (JP)

(72) Inventor: Kazuhiko Morisaki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 264 days.

(21) Appl. No.: 15/484,694

(22) Filed: Apr. 11, 2017

(65) Prior Publication Data

US 2017/0302520 A1    Oct. 19, 2017

(30) Foreign Application Priority Data

Apr. 15, 2016  (JP) ................... 2016-082494

(51) Int. Cl.
*H04L 12/24* (2006.01)
*H04L 29/06* (2006.01)

(52) U.S. Cl.
CPC ...... *H04L 41/0866* (2013.01); *H04L 41/0853* (2013.01); *H04L 63/0876* (2013.01)

(58) Field of Classification Search
CPC ....... H04L 67/34; H04L 41/22; H04L 67/125; H04L 41/0806; H04L 41/0853; H04L 41/0859; H04L 41/0866; H04L 63/0876
See application file for complete search history.

(56) References Cited

U.S. PATENT DOCUMENTS

| 5,757,648 | A | 5/1998 | Nakamura | |
|---|---|---|---|---|
| 8,359,378 | B2 | 1/2013 | Kudo | |
| 8,667,293 | B2* | 3/2014 | Birtwhistle | H04L 9/3268 713/182 |
| 8,676,901 | B1* | 3/2014 | Nicolaou | H04L 51/08 709/203 |
| 8,977,727 | B2* | 3/2015 | Birtwhistle | G16H 40/40 709/221 |
| 9,015,692 | B1* | 4/2015 | Clavel | G06F 16/95 717/168 |
| 9,313,160 | B1* | 4/2016 | Shamis | H04L 51/16 |
| 9,553,935 | B2* | 1/2017 | Johnson | H04L 67/16 |
| 9,712,492 | B1* | 7/2017 | Kim | H04L 63/0272 |
| 2007/0112944 | A1* | 5/2007 | Zapata | G06F 8/65 709/221 |
| 2007/0186037 | A1* | 8/2007 | Winzenried | G06F 21/10 711/111 |
| 2009/0007091 | A1* | 1/2009 | Appiah | G06F 8/658 717/171 |

(Continued)

FOREIGN PATENT DOCUMENTS

| JP | H03167601 A | 7/1991 |
|---|---|---|
| JP | B-2771701 B2 | 7/1998 |

(Continued)

*Primary Examiner* — Shean Tokuta
(74) *Attorney, Agent, or Firm* — RatnerPrestia

(57) ABSTRACT

An application software execution system according to the present invention includes a plurality of machines and one server connected to the machines. The server includes a processor for executing application software, and a storage unit for storing the application software. The server obtains configuration information of each of the machines, and executes the application software in accordance with the obtained configuration information of each of the machines.

8 Claims, 5 Drawing Sheets

(56) References Cited

U.S. PATENT DOCUMENTS

| | | | |
|---|---|---|---|
| 2009/0031008 A1* | 1/2009 | Elliott | H04L 61/1517 709/220 |
| 2009/0138579 A1* | 5/2009 | Jung | H04L 41/0253 709/221 |
| 2010/0180016 A1* | 7/2010 | Bugwadia | G06F 9/4411 709/220 |
| 2010/0218179 A1* | 8/2010 | Balascio | G06F 8/65 717/171 |
| 2011/0051178 A1* | 3/2011 | Kono | H04N 1/00416 358/1.15 |
| 2011/0066531 A1* | 3/2011 | Kawabata | G06Q 30/04 705/34 |
| 2011/0191686 A1* | 8/2011 | Wolff-Petersen | G06F 15/177 715/735 |
| 2011/0283275 A1* | 11/2011 | Dan | G06F 8/61 717/176 |
| 2011/0314137 A1* | 12/2011 | Vermoesen | H04L 41/028 709/221 |
| 2012/0110564 A1* | 5/2012 | Ran | G06F 8/65 717/173 |
| 2012/0174093 A1* | 7/2012 | Davila | G06F 8/61 717/178 |
| 2012/0221717 A1* | 8/2012 | Sela | G06F 11/2294 709/224 |
| 2013/0227090 A1* | 8/2013 | Nissler | G06F 21/57 709/220 |
| 2013/0339734 A1* | 12/2013 | Vernia | H04L 63/0428 713/168 |
| 2014/0007076 A1* | 1/2014 | Kim | H04W 4/70 717/173 |
| 2014/0274380 A1* | 9/2014 | Kazama | A63F 13/355 463/31 |
| 2015/0040239 A1* | 2/2015 | Buerk | G06F 21/88 726/26 |
| 2015/0242297 A1* | 8/2015 | Johnson, Jr. | G06F 11/3466 702/186 |
| 2015/0350806 A1* | 12/2015 | Britton | H04M 1/72525 455/411 |
| 2015/0381547 A1* | 12/2015 | Mandanapu | H04L 51/24 709/206 |
| 2016/0070551 A1* | 3/2016 | Miller | G06F 16/958 717/148 |
| 2016/0154644 A1* | 6/2016 | Chhawchharia | G06F 8/71 717/107 |
| 2016/0191318 A1* | 6/2016 | Neilson | H04L 41/0869 709/220 |
| 2016/0294951 A1* | 10/2016 | Durrant | H02J 7/0047 |
| 2016/0378462 A1* | 12/2016 | Hu | H04L 67/34 717/173 |
| 2017/0031885 A1* | 2/2017 | S G | G06F 16/957 |
| 2017/0127214 A1* | 5/2017 | Sohn | H04W 4/12 |
| 2017/0149569 A1* | 5/2017 | Prabhu | H04L 9/3247 |
| 2017/0302520 A1* | 10/2017 | Morisaki | H04L 41/0866 |
| 2017/0308052 A1* | 10/2017 | Kajiyama | G05B 19/402 |
| 2018/0181092 A1* | 6/2018 | Sekine | G05B 15/02 |

FOREIGN PATENT DOCUMENTS

| | | |
|---|---|---|
| JP | 2000035811 A | 2/2000 |
| JP | 2003067019 A | 3/2003 |
| JP | 2004005400 A | 1/2004 |
| JP | 2007304881 A | 11/2007 |
| JP | 2011107957 A | 6/2011 |
| JP | 2013031096 A | 2/2013 |
| WO | 9810890 A1 | 3/1998 |
| WO | 2007060721 A1 | 5/2007 |

* cited by examiner

PRIOR ART

SERVER-BASED APPLICATION SOFTWARE EXECUTION SYSTEM

This application is a new U.S. patent application that claims benefit of JP 2016-082494 filed on Apr. 15, 2016, the content of 2016-082494 is incorporated herein by reference.

BACKGROUND OF THE INVENTION

1. Field of the Invention

The present invention relates to a system for executing application software, and more specifically relates to a system that obtains information about the configurations of two or more machine tools and executes application software in accordance with the configuration of each machine tool.

2. Description of Related Art

Machine tools process workpieces by machining programs including two or more machining steps. To generate the machining programs, there is known a method in which the machining programs are generated in an interactive manner on the machine tools (for example, Japanese Patent No. 2771701). In this method, software (hereinafter called "interactive software") to generate the machining programs in an interactive manner is required to be installed in the machine tools.

FIG. 1 shows the configuration of a conventional interactive numerically controlled apparatus. In FIG. 1, the conventional interactive numerically controlled apparatus includes a monitor 1001, a storage unit 1002, a display control unit 1003, an input unit 1004, a program memory 1005, and an interactive numerically controlled unit 1006. An operator inputs required data from the input unit 1004, such as a keyboard, to the interactive numerically controlled unit 1006 in an interactive manner, while watching the monitor 1001. The storage unit 1002 stores the input data and execution data. The interactive numerically controlled unit 1006 generates an interactive machining program, which includes the execution data on a machining shape of a workpiece, based on the input data from the input unit 1004.

In the conventional art, it is necessary to make settings on interactive software in advance so as to optimally operate the interactive software in accordance with the configuration of a machine tool, i.e., the presence or absence of optional functions, parameter values, and the like. Depending on the settings, for example, only an interactive screen that corresponds to the machine tool may be displayed, and a machining program that is appropriate to the axis names and optional functions of the machine tool may be generated. When there are two or more machine tools, whether the configurations of machine tools are identical or not has to be determined by humans.

Thus, when generating machining programs for two or more machine tools, the following problems arise.

(1) Installing interactive software in each individual machine tool requires cost and effort. Updating the interactive software also requires the same effort.

(2) Settings have to be made on each individual machine tool in accordance with the configuration of the machine tool.

(3) When past similar programs are desired to be reused, it requires time and effort to list only machining programs for identical machine tools.

(4) Spreading a generated machining program to other identical machines requires time and effort.

SUMMARY OF THE INVENTION

The present invention aims at providing a system that obtains information about the configurations of two or more machine tools and executes application software in accordance with the configuration of each machine tool.

An application software execution system according to an embodiment of the present invention includes a plurality of machines and one server connected to the machines. The server includes a processor for executing application software, and a storage unit for storing the application software. The server obtains configuration information of each of the machines, and executes the application software in accordance with the obtained configuration information of each of the machines.

BRIEF DESCRIPTION OF THE DRAWINGS

The objects, features, and advantages of the present invention will be more apparent from the following description of embodiments in conjunction with the attached drawings, wherein.

DETAILED DESCRIPTION OF THE INVENTION

An application software execution system according to the present invention will be described below with reference to the drawings.

First Embodiment

Figure 1:
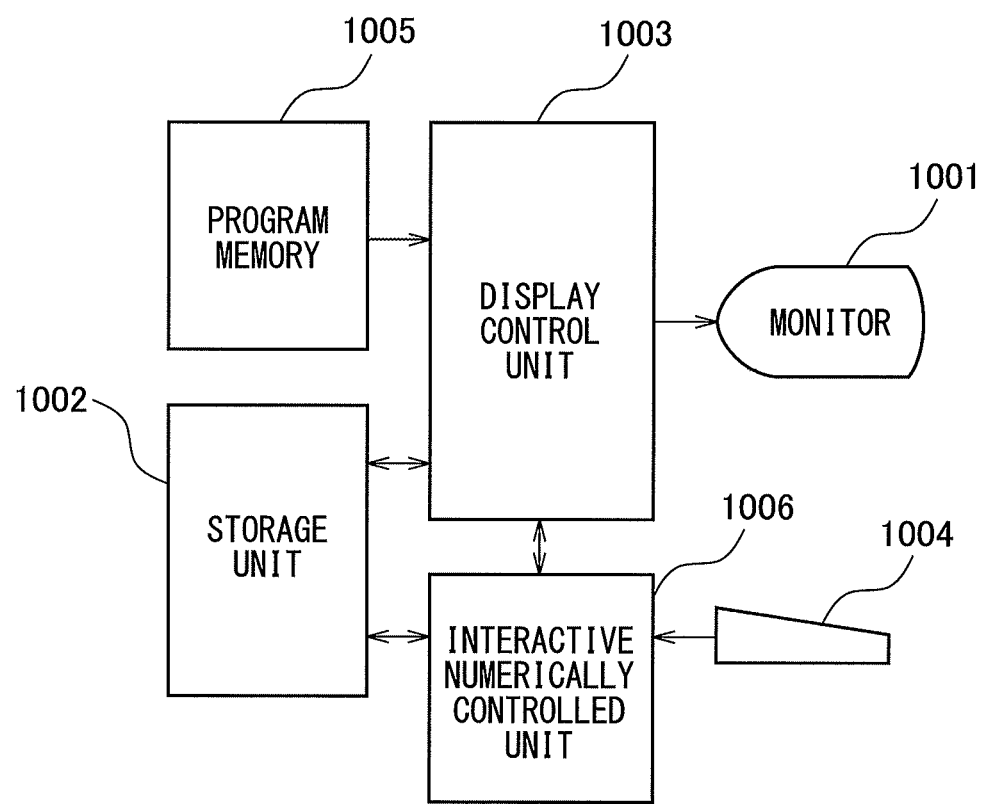
FIG. 1 is a block diagram showing the configuration of a conventional interactive numerically controlled apparatus.
Figure 2:
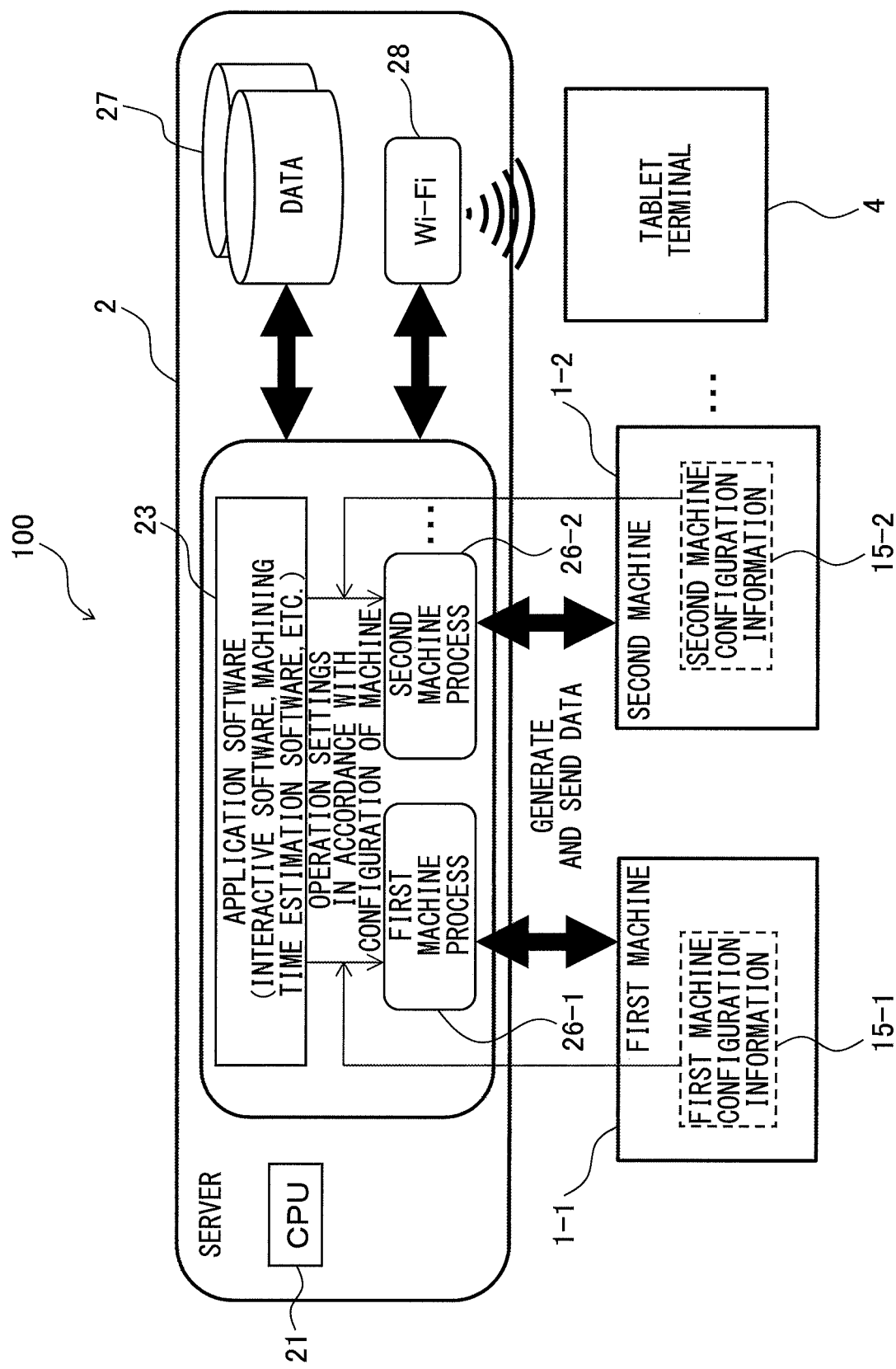
FIG. 2 is a block diagram of an application software execution system according to a first embodiment of the present invention.

An application software execution system according to a first embodiment of the present invention will be described. FIG. 2 is a block diagram of an application software execution system 100 according to the first embodiment of the present invention. The application software execution system 100 according to the first embodiment of the present invention includes a plurality of machines (a first machine 1-1, a second machine 1-2, . . . , and an n-th machine 1-$n$ (not shown), hereinafter indicated by 1-$i$ where i=1, 2, . . . , and n) and one server 2 connected to the machines.

The server 2 includes a CPU 21 that is a processor for executing application software, and a storage unit 23 that is a server storage unit for storing the application software. The server 2 obtains configuration information from configuration information storage units 15-1, 15-2, . . . , and 15-$n$ (hereinafter indicated by 15-$i$) of the individual machines 1-$i$, and executes the application software in accordance with the obtained configuration information of each machine.

As the application software, there are interactive software, machining time estimation software, and the like. However, these are just examples, and the application software is not limited thereto.

By executing the application software in accordance with the configuration information of each machine, a first machine process, a second machine process, . . . , and an n-th machine process are generated and stored in a first process storage unit 26-1, a second process storage unit 26-2, . . . , and an n-th process storage unit 26-$n$ (not shown), respectively. When generating the first machine process and the like, data on design values stored in a data storage unit 27 is usable.

Each machining program, e.g., the first machine process, generated by the server 2 is transmitted to each machine, e.g., the first machine 1-1, to machine a product.

In the application software execution system according to the first embodiment of the present invention, the application software, e.g., the interactive software or the machining time estimation software, is installed in the server 2, instead of in each individual machine 1-1, 1-2, . . . , or 1-$n$. The server 2 obtains the configuration information (the presence or absence of optional functions and parameter values) of each machine, and provides an appropriate operation to each machine.

In the example of FIG. 2, in the application software execution system 100, the server 2 may further include a transceiver 28 for transmitting and receiving signals to and from a communication device 4, such as a tablet terminal, and the application software may be accessible from the communication device 4. However, not limited thereto, the application software may be operated without using the communication device 4. The tablet terminal is just an example of the communication device 4, and not limited thereto, the communication device 4 may be any portable terminal having a communication function such as a cellular phone and a game machine. FIG. 2 shows the transceiver 28 using a Wi-Fi network, but the invention is not limited to this example.

The application software execution system according to the first embodiment of the present invention eliminates the need to install the application software in a control unit of each individual machine, and facilitates updating the application software. Moreover, the application software is accessible from the communication device, such as the tablet terminal.

Furthermore, the application software execution system according to the first embodiment of the present invention allows centralized management of data used by the application software in the server, thus easing reuse of data of identical machines.

Second Embodiment

Figure 3:
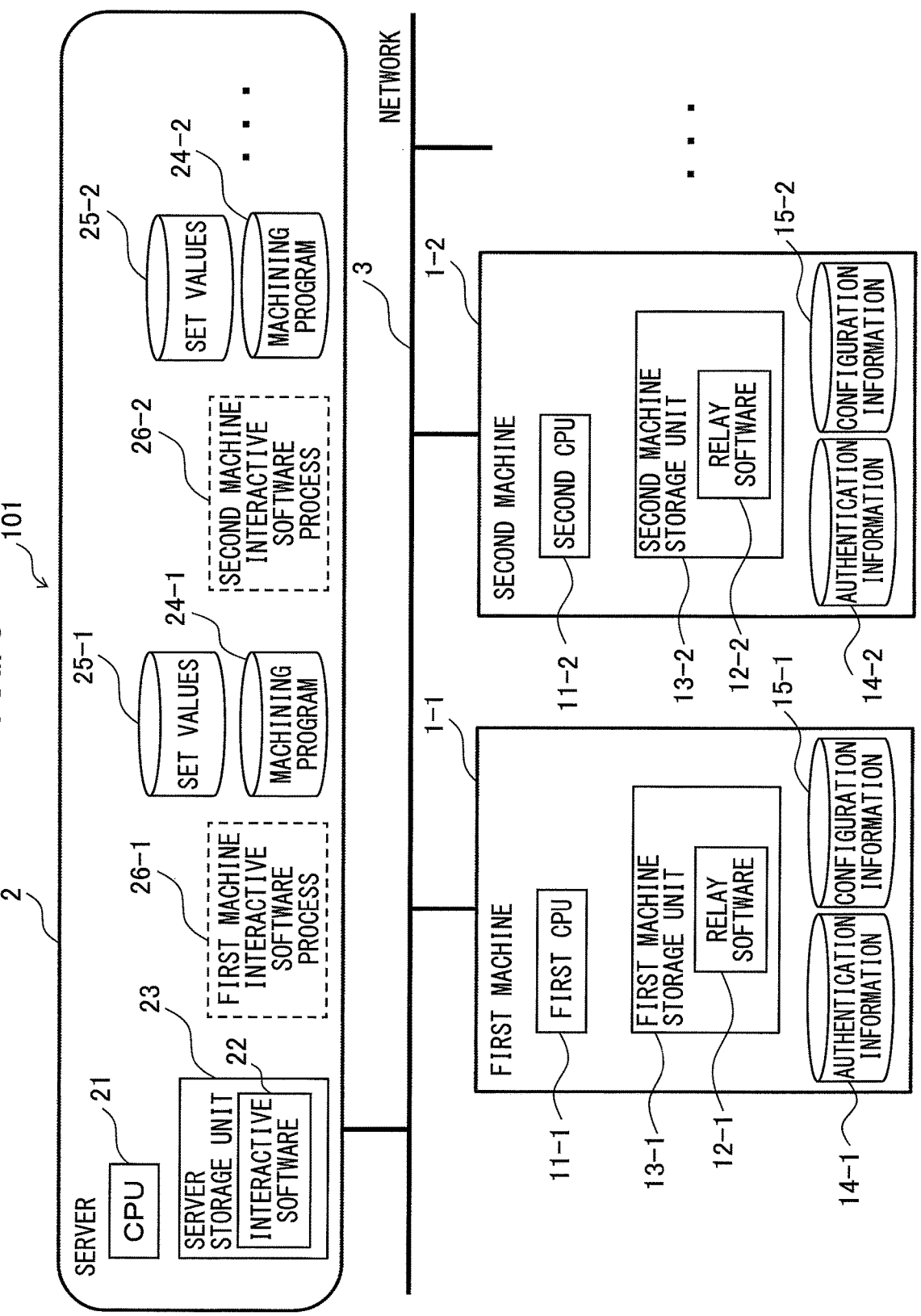
FIG. 3 is a block diagram of an application software execution system according to a second embodiment of the present invention.

Next, an application software execution system according to a second embodiment of the present invention will be described. FIG. 3 is a block diagram of an application software execution system 101 according to the second embodiment of the present invention. In the application software execution system 101 according to the second embodiment of the present invention, a plurality (e.g., n number) of machine tools (hereinafter also simply called "machines") 1-$i$ and one server 2 are connected through a network 3. The first machine 1-1 includes a first CPU 11-1 that is a first machine processor, a first machine storage unit 13-1 for storing relay software 12-1, a first authentication information storage unit 14-1 for storing authentication information on the first machine, and a first configuration information storage unit 15-1 for storing configuration information on the first machine. In a like manner, the second machine 1-2 includes a second CPU 11-2 that is a second machine processor, a second machine storage unit 13-2 for storing relay software 12-2, a second authentication information storage unit 14-2 for storing authentication information on the second machine, and a second configuration information storage unit 15-2 for storing configuration information on the second machine.

Taking interactive software as an example of application software, the application software execution system 101 according to the second embodiment of the present invention will be described. The first CPU 11-1, i.e., the first machine processor, executes the relay software 12-1, which is software for relaying display data and operation data from and to interactive software 22, i.e., application software, in the server 2. In a like manner, the second CPU 11-2, i.e., the second machine processor, executes the relay software 12-2, which is software for relaying display data and operation data from and to the interactive software 22 in the server 2. The display data includes, for example, data for displaying a data input interactive screen and data required to draw a tool path. The operation data includes data inputted by a key operation, a touch panel operation, or a mouse operation on the machine tool.

As the authentication information stored in each of the authentication information storage units 14-1, 14-2, . . . , and 14-$n$, there are a numerically controlled apparatus (CNC) ID, a machine (MAC) ID, and the like. As the configuration information stored in each of the configuration information storage units 15-1, 15-2, . . . , and 15-$n$, there are the number of axes of each machine tool 1-$i$, axis names, optional functions, parameters, and the like.

The server 2 includes a CPU 21 that is a server processor, and a server storage unit 23 for storing the interactive software 22. The CPU 21 executes the interactive software 22. The server 2 also includes a first machining program storage unit 24-1 for storing a machining program generated for the first machine 1-1, a first set value storage unit 25-1 for storing set values on the first machine 1-1, and a first process storage unit 26-1 for storing a first machine interactive software process. Likewise, the server 2 also includes a second machining program storage unit 24-2 for storing a machining program generated for the second machine 1-2, a second set value storage unit 25-2 for storing set values on the second machine 1-2, and a second process storage unit 26-2 for storing a second machine interactive software process. The interactive software processes are run on the CPU 21 of the server 2 using the process storage units 26-1, 26-2, . . . , and 26-$n$, i.e., memory units.

Figure 4:
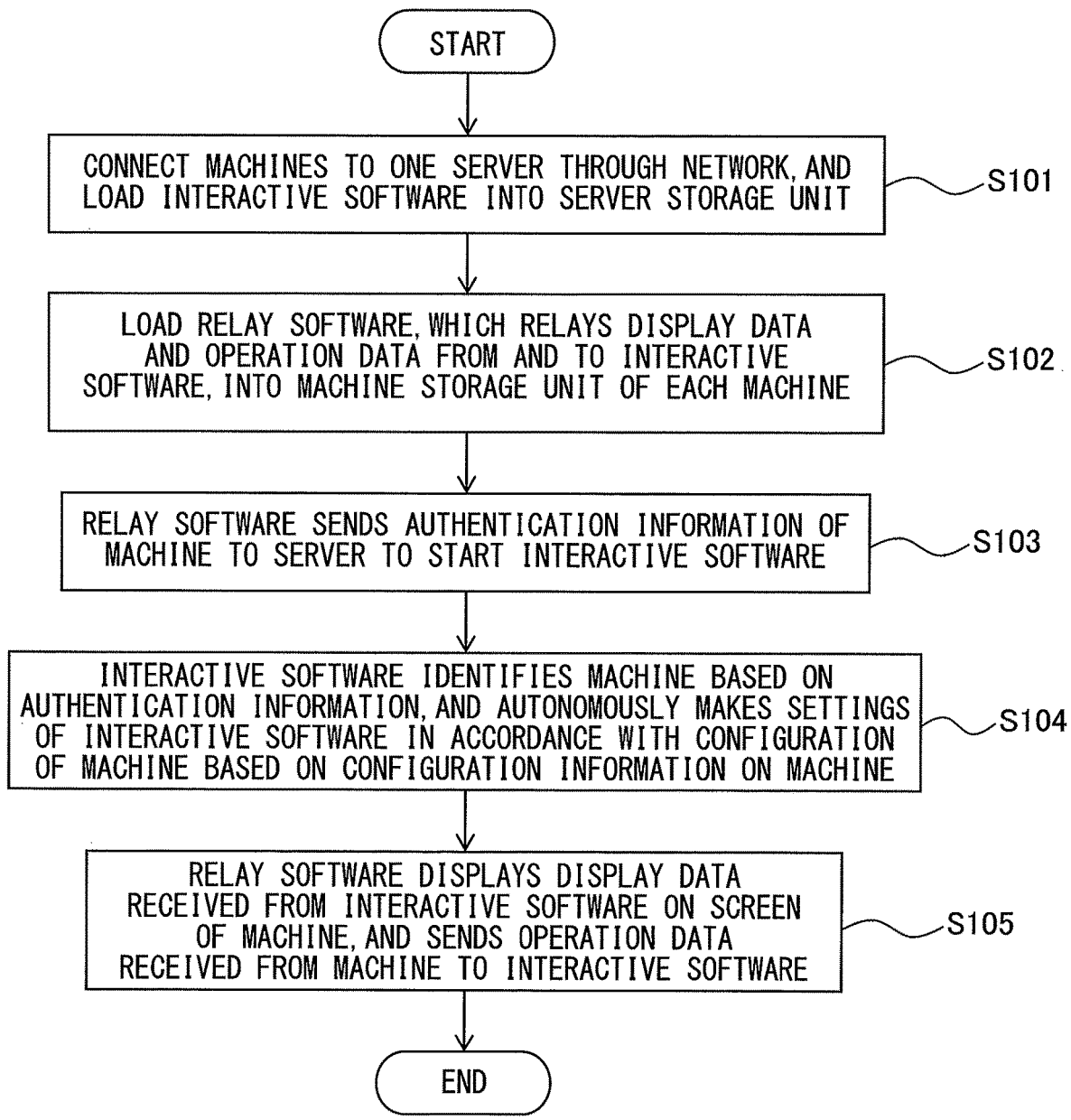
FIG. 4 is a flowchart of the operation of the application software execution system according to the second embodiment of the present invention.

Next, the operation of the application software execution system according to the second embodiment of the present invention will be described with reference to the flowchart of FIG. 4.

First, in step S101, a plurality of machines 1-$i$ are connected to a server 2 through a network 3, and interactive software 22 is loaded into a server storage unit 23.

In step S102, in each machine (for example, a first machine 1-1), relay software 12-1, which relays display data and operation data from and to the interactive software 22, is loaded into a first machine storage unit 13-1.

In step S103, the relay software 12-1 sends authentication information stored in a first authentication information storage unit 14-1 of the first machine 1-1 to the server 2, in order to start the interactive software 22.

In step S104, the interactive software 22 identifies the first machine 1-1 based on the authentication information, and autonomously makes settings of the interactive software in accordance with the configuration of the first machine by obtaining configuration information on the first machine. The obtained configuration information of each machine is stored in the server 2.

In step S105, the relay software 12-1 receives display data from the interactive software 22 and displays the data on a screen of the first machine 1-1. The relay software 12-1 receives operation data on the machine and sends the data to the interactive software 22.

Lastly, the interactive software 22 sends a machining program to the machine identified based on the authentication information, in order to operate the first machine 1-1.

The method for generating the machining program for the first machine 1-1 is described above, and machining programs for the other machines, including the second machine 1-2, can be generated in the same manner.

When a plurality of machines 1-i are connected to a server 2, a plurality of interactive software processes are run on the server 2.

In the above description, the interactive software 22 obtains the configuration information of the machines from the individual machines, and stores the configuration information in the server 2. However, not limited thereto, monitoring software may connect the server 2 to each machine, independently of the interactive software 22, and obtain and store the configuration information.

Past similar data may be reused. In this case, the interactive software 22 installed in the server 2 may identify identical machines based on the configuration information of the individual machines stored in the server 2, and may list only data on the identical machines. The data may be machining programs, but is not limited thereto.

The plurality of machines may include identical machines. In this case, the identical machines may be identified from the plurality of machines, and operated using the same data sent from the server 2.

The server 2 may obtain data from at least one of the machines, and the interactive software, i.e., the application software, may process the data.

As described above, the application software execution system according to the second embodiment of the present invention eliminates the need to install the interactive software in each individual machine. Thus, all that is required to update the interactive software is to update the interactive software in the server. The application software execution system also eliminates the need to make settings in each individual machine in accordance with the configuration of each machine. When reusing past similar data, the application software execution system can list only data on identical machines, thus allowing a reduction in time and effort to search the data and an improvement in operability. Searching identical machines and sending generated data to the identical machines allow improvement in operability.

The above second embodiment takes the interactive software as an example of the application software. However, not limited thereto, machining time estimation software may be used as the application software.

Third Embodiment

Figure 5:
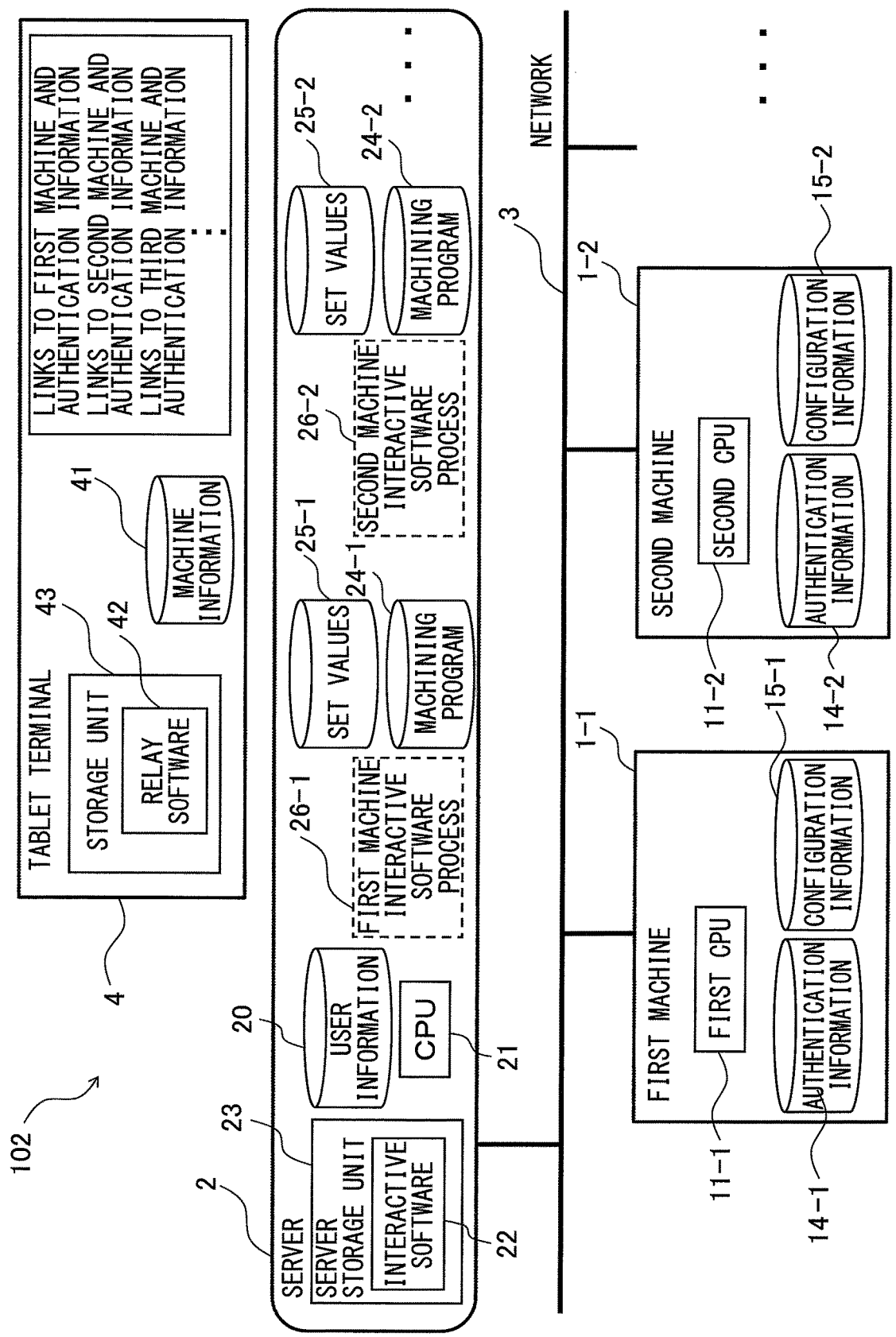
FIG. 5 is a block diagram of an application software execution system according to a third embodiment of the present invention.

Next, an application software execution system according to a third embodiment of the present invention will be described. FIG. 5 is a block diagram of an application software execution system 102 according to the third embodiment of the present invention. The difference between the application software execution system 102 according to the third embodiment and the application software execution system 101 according to the second embodiment is that relay software 42 is stored in a storage unit 43 of a tablet terminal 4, i.e., a communication device, and the tablet terminal 4 communicates with a server 2 to generate machining programs for machines. The other configurations of the application software execution system 102 according to the third embodiment are the same as those of the application software execution system 101 according to the second embodiment, so a detailed description is omitted.

Taking interactive software as an example of application software, the application software execution system 102 according to the third embodiment of the present invention will be described. The tablet terminal 4 accesses the server 2, and inputs a user name and a password to log on to the server 2. The server 2 verifies the user name and the password against user information stored in a user information storage unit 20, and permits access from the tablet terminal 4.

The tablet terminal 4 includes a machine information storage unit 41 for storing machine information. The machine information includes information regarding links to a first machine and authentication information on the first machine. The tablet terminal 4 chooses a machine whose machining program is to be generated. By way of example, a first machine 1-1 is chosen here.

The tablet terminal 4 obtains authentication information on the first machine 1-1 based on the machine information. Next, the relay software 42 sends the authentication information on the first machine 1-1 to the server 2, and starts interactive software 22 to execute a first machine interactive software process. Based on the interactive software process, the server 2 obtains configuration information on the first machine 1-1. The obtained configuration information is stored in the server 2.

The interactive software 22 automatically sets values on the interactive software based on the obtained configuration information. Display data on the interactive software is displayed on the tablet terminal 4, and a required operation performed on the tablet terminal 4 is sent to the server 2.

A machining program is generated in the interactive software process, and the generated machining program is sent to the first machine 1-1. The first machine 1-1 machines a workpiece in accordance with the received machining program.

According to the application software execution system of the third embodiment of the present invention, the tablet terminal has access to the server to generate the machining program, thus allowing operation in a location away from the machines.

The above third embodiment takes the interactive software as an example of the application software. However, not limited thereto, machining time estimation software may be used as the application software.

In the above embodiments, the server executes the application software. However, not limited thereto, a component other than the server may execute the application software.

According to the application software execution system of the embodiments of the present invention, it is possible to obtain the configuration information on the two or more machine tools and execute the application software in accordance with the configuration of each machine tool.

What is claimed is:
1. An application software execution system comprising:
a plurality of machines; and one server connected to the machines,
wherein the server includes:
  a processor for executing application software; and
  a storage unit for storing the application software, and
wherein the server:
  obtains configuration information indicating a presence or absence of optional functions and parameter values of each of the machines,
  executes the application software in accordance with the obtained configuration information of each of the machines to generate respective machining programs for each of the machines, the respective machining programs including machining steps to machine a workpiece, and
  transmits the respective machining programs to the machines, and
wherein the machines execute the respective machining programs, and
wherein the application software is not installed on the machines.

2. The application software execution system according to claim 1,
wherein the server further includes a transceiver for transmitting and receiving a signal to and from a communication device, and
wherein the communication device has access to the application software.

3. An application software execution system comprising:
a plurality of machines; and
one server connected to the machines through a network,
wherein the server includes:
  a server processor;
  a server storage unit for loading application software being software to be executed by the server processor to generate respective machining programs for each of the machines, the respective machining programs including machining steps for controlling the machines; and
  a machining program storage unit for storing the respective machining programs generated for each of the machines,
wherein each of the machines includes:
  a machine processor; and
  a machine storage unit for loading relay software being software to be executed by the machine processor to relay display data and operation data from and to the application software;
wherein the application software identifies the machine based on authentication information on the machine, obtains configuration information on the machine, and autonomously makes a setting of the application software in accordance with the configuration of the machine,
wherein the relay software sends the authentication information on the machine to the server to start the application software, receives the display data from the application software to display the display data on a screen of the machine, and receives the operation data from the machine to send the operation data to the application software,
wherein the application software sends the respective machining programs to the machines identified based on the authentication information,
wherein the machines execute the respective machining programs, and
wherein the application software is not installed on the machines.

4. The application software execution system according to claim 3,
wherein when the plurality of machines are connected to the server, a plurality of application software processes are run on the server.

5. The application software execution system according to claim 3,
wherein monitoring software installed in the server connects the server to each of the machines independently of the application software, and obtains and stores the configuration information.

6. The application software execution system according to claim 3,
wherein when reusing past similar data, the application software installed in the server identifies identical machines based on the configuration information of the individual machines stored in the server, and lists only data on the identical machines.

7. The application software execution system according to claim 3,
wherein identical machines are identified from the plurality of machines, and operated using the same data.

8. The application software execution system according to claim 3,
wherein the server obtains data from at least one of the plurality of machines, and the application software processes the data.

* * * * *